Jan. 13, 1959  W. R. GIESKE  2,869,072
DEVICE FOR EXPLORING FERROMAGNETIC STRUCTURE IN WELL BORES
Filed Sept. 17, 1953  3 Sheets-Sheet 1
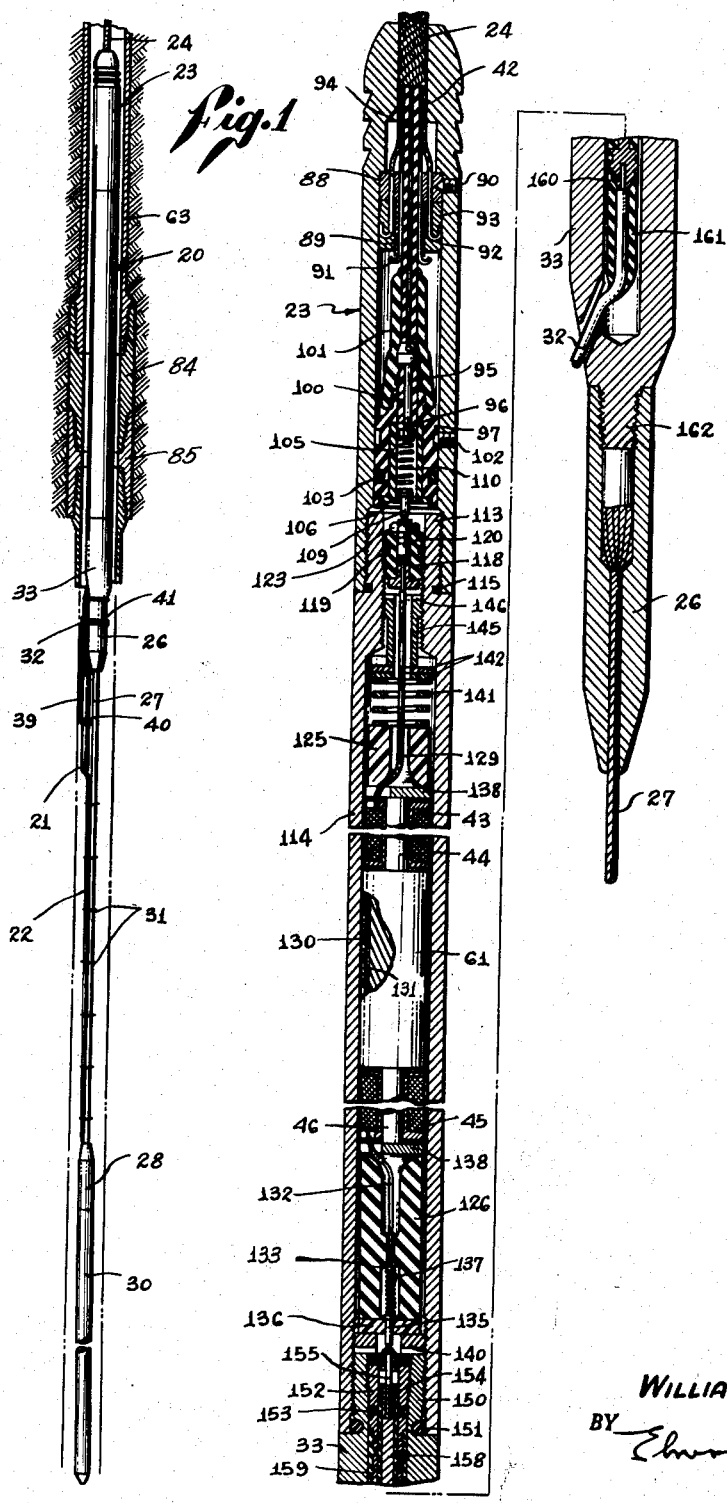
INVENTOR.
WILLIAM R. GIESKE
BY
Attorney Jan. 13, 1959   W. R. GIESKE   2,869,072
DEVICE FOR EXPLORING FERROMAGNETIC STRUCTURE IN WELL BORES
Filed Sept. 17, 1953   3 Sheets-Sheet 2
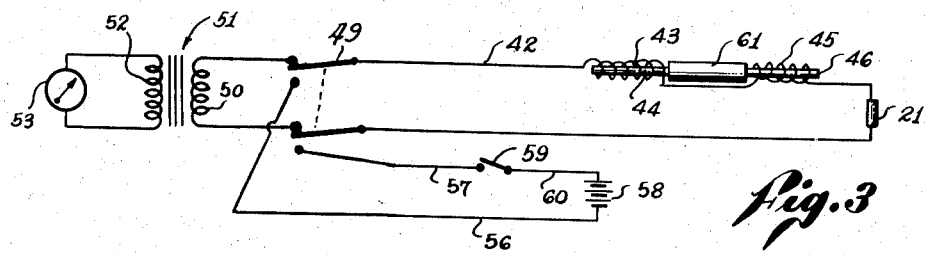
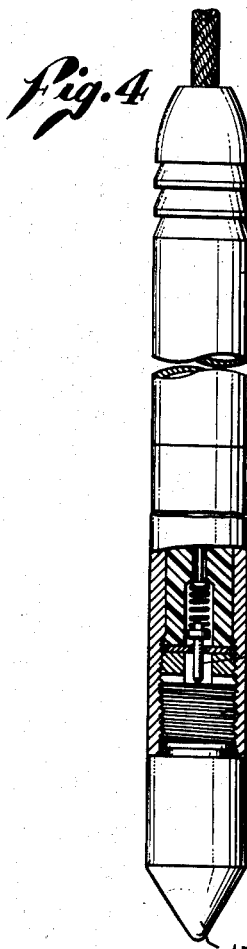
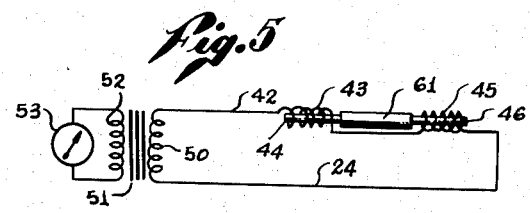
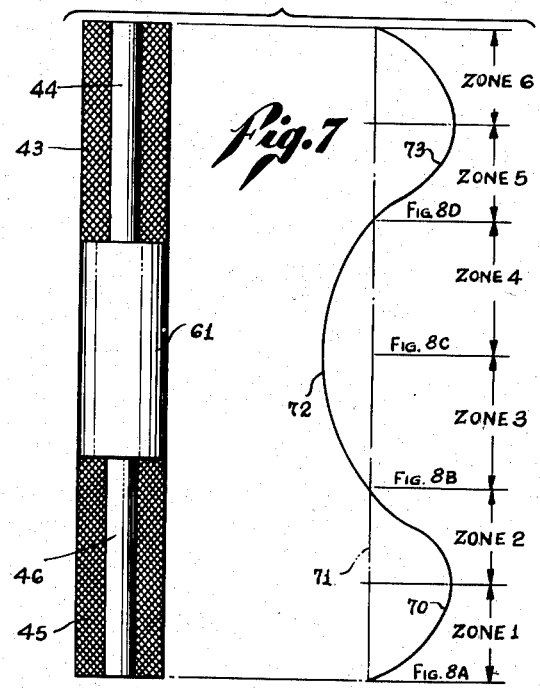
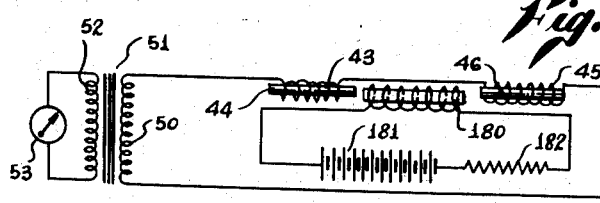
INVENTOR.
WILLIAM R. GIESKE
BY
Attorney

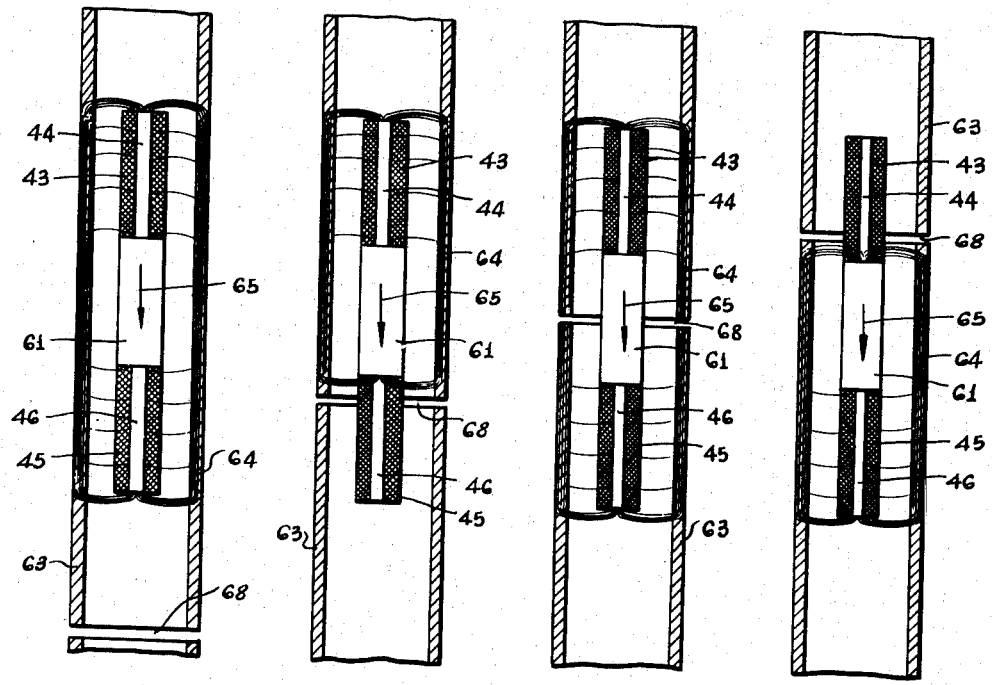

United States Patent Office 2,869,072
Patented Jan. 13, 1959

2,869,072

DEVICE FOR EXPLORING FERROMAGNETIC STRUCTURE IN WELL BORES

William R. Gieske, Fullerton, Calif., assignor to The Ford Alexander Corporation, Whittier, Calif., a corporation of California Application September 17, 1953, Serial No. 380,803

8 Claims. (Cl. 324—34)

This invention relates to devices for exploring the metal structure in an oil well bore or the like, for the purpose of ascertaining points at which the metal structure changes in configuration. The invention is directed to such problems as: the problem of ascertaining the location of tools and other metal objects in a well bore; the problem of detecting and locating ends, joints, breaks and other changes in configuration in casing, tubing, and drill pipes; and the problem of distinguishing among various types of joints and connectors in casing, tubing, and drill pipe.

The broad object of the invention is to provide a detector for this purpose that has an exceptionally high degree of sensitivity so that it will respond to closely-spaced configuration changes individually and, moreover, will distinguish among various kinds of changes in configuration. With such sensitivity, the detector will readily and reliably identify different types of joints and connectors, detect the tops or bottoms of collars, and locate specific fishing tools in the string.

The invention is especially suitable for use as a detector of the type commonly known as a collar locator or collar finder. Such an embodiment of the invention will be described herein by way of disclosure and to illustrate the principles involved.

An important object of the invention is to provide an exceptionally compact means for achieving the desired high degree of sensitivity. A detector device of the types heretofore available may be successful in relatively large diameter casing, but when scaled down to a relatively small outside diameter, say a diameter of an inch and a half, to fit into drill pipe, will fail to operate satisfactorily if at all. The problem is to provide detector means of relatively small diameter capable of generating a relatively strong signal.

Another object of the preferred form of invention is to provide an exceptionally simple, rugged and reliable detector of this kind. A special feature of invention in this respect is the complete absence of moving parts. A further feature is the elimination of any power source apart from the non-moving parts of the detector itself, the detector being constructed to serve as a power generator when moved bodily through ferromagnetic structure being explored.

A special object of the preferred practice of the invention is to provide a detector device of this character that may be combined with an explosive charge so that the detector, together with the explosive charge, may be lowered as a unit into a well and then the portion of the detector circuit that extends into the well may be used to detonate the explosive. The coupling of a detector and a detonator into the same circuit not only eliminates the necessity of separately running the detector and explosive down the well bore, but also precludes any error in the positioning of the explosive relative to a desired point in the well as determined by the detector.

At first thought, it would seem to be extremely dangerous to have a detonator included in an actively functioning detector circuit because of the possibility of a signal in the detector circuit causing a premature explosion. If a high amperage E. M. F. source is used for detection, there is also always the possibility that some kind of failure will result in the release of sufficient electric energy to cause a premature detonation. In the present invention, however, the safety problem is solved by employing a detector device which generates its own E. M. F. by movement in the well bore and which is inherently incapable of generating a signal current of sufficient magnitude to set off the detonator. The detector device generates a signal of sufficient strength for clear indication of the changing structure of the metal walls traversed by the detector but the maximum strength of the detection signal is substantially less than one percent of the signal strength necessary to detonate the explosive. Thus, the detector may be used to generate signals for guidance in positioning an explosive that accompanies the detector and then, after the exploration procedure has been completed, a stronger E. M. F. source at the top of the well may be connected to the portion of the detector circuit that extends into the well to detonate the explosive.

Broadly described, the invention attains these objects by lowering into the well bore a magnetic field oriented longitudinally with the well bore and by employing two oppositely-wound coils, positioned respectively in the two ends of the magnetic field. The two coils being positioned within the field are sensitive to changes of distortions in the flux pattern of the field. Exceptionally high sensitivity is attained by using oppositely-wound coils connected in series so that opposite changes in the linkage of the flux with the two coils will be additive in the common circuit of the coils. Thus an increase in the number of magnetic lines of force linked with one coil and a simultaneous reduction in the number of lines of magnetic force linked with the other coil, cooperate to generate current flow in the detector circuit. It has been found that as the magnetic field is lowered through the well bore with its lines of force linked with the surrounding metal walls of the bore, changes in the configuration of the metal walls always cause simultaneous increase in the magnetic linkage with one coil and a decrease in magnetic linkage with the other coil.

The above and other objects and advantages of the invention will be apparent in the following detailed description of the presently preferred form of the invention considered with the accompanying drawings.

In the drawings, which are to be regarded as merely illustrative:

Fig. 1 is a side elevation of the invention as used with an accompanying explosive charge, the invention being shown inside a drill pipe;

Fig. 2 is a longitudinal section on an enlarged scale of the detector unit in Fig. 1;

Fig. 3 is a simplified wiring diagram of the electrical system that is used when the detector is combined with an explosive charge;

Fig. 4 is a view partly in side elevation and partly in section, showing the detector unit ready for use separate from an explosive charge;

Fig. 5 is a wiring diagram of the electrical system for the detector as used separate from an explosive charge;

Fig. 6 is a wiring diagram similar to Fig. 5, illustrating a modified practice of invention;

Fig. 7 is a diagram indicating the character of signal that is generated by movement of the detector past a break or joint in a tubular wall; and Figs. 8A, 8B, 8C and 8D are diagrams indicating the changes in configuration of the magnetic field as the magnetic field passes a break in the surrounding metal wall.

3
General arrangement

In Fig. 1, illustrating a preferred practice of invention, a detector unit 20 constructed in accord with the present teachings is combined with a suitable blasting cap or detonator 21 to set off an explosive in the form of a cord 22. At the upper end of the detector unit 20 is a rope socket 23, by means of which the assembly is attached to the end of a supporting cable 24, and at the lower end of the unit is a second rope socket 26 for engagement with the upper end of a flexible by-pass line 27. Connected to the lower end of the by-pass line 27 by a rope socket 28 is a suitable weight or sinker bar 30. Thus, the sinker bar, by its weight, holds the by-pass line 27 taut.

In a typical practice of the invention, the by-pass line will be relatively short, say approximately five feet long, and the sinker bar will be approximately the same length. Explosive cord 22 is attached to the by-pass line 27 at spaced points by loops of tape 31 and the detonator 21, which is connected to the upper end of the explosive cord is, in turn, connected to the detector unit 20 by a suitable insulated wire conductor 32. The conductor 32 enters the detector unit 20 through a shooting adaptor 33.

One side of an electrical circuit for communication with the top of the well is provided by the outer metal of the supporting cable 24 and the other side of the circuit is an insulated conductor in the core of the cable. The detector means inside the detector unit is electrically connected at its upper end to the conductor inside the cable 24 and at its lower end is electrically connected to the insulated wire 32 leading to the detonator 21. To complete this circuit a piece of wire 39 is wound at its lower end on the detonator 21 as indicated at 40, and is wound at its upper end on the rope socket 26 as indicated at 41. Usually protective tape (not shown) is wound around the rope socket 26 and the detonator 21 to form a protective covering for the wire 39.

The electric circuits for the assembly shown in Fig. 1 may be understood by referring to the wiring diagram in Fig. 3. One side of the detector circuit is formed by the cable 24 as previously explained and the other side is formed by a conductor 42 inside the cable. The detector unit includes a first pick-up coil or detector coil 43 wound on an iron core 44, and a second pick-up coil or detector coil 45 wound on a second iron core 46, the two coils being in series with each other end and in series with the detonator 21.

Normally, the detector circuit is connected by a double-pole double-throw switch 49 with the primary coil 50 of a transformer 51, the secondary coil 52 of the transformer being connected to a suitable indicating device such as a microammeter 53. Thus signals generated in the detector coils 43 and 45 are transmitted through the detonator 21 to the transformer 51 for indication by the ammeter 53 or other indicating device. The strength of the signal current generated by the two detector coils 43 and 45 is exceedingly low, being on the order of 5 milliamperes, whereas current flow on the order of magnitude of one ampere is required to set off the detonator 21.

For the purpose of firing the explosive in the well, the position of the double-pole, double-throw switch 49 at the surface of the well is shifted to connect the detector circuit with a firing circuit that includes two leads 56 and 57. Lead 56 is connected to one side of a suitable battery 58; lead 57 is connected to one side of a firing switch 59; and the circuit is completed by a lead 60 interconnecting the battery and firing switch. When the firing circuit is connected in this manner with the detector circuit, the detonator 21 may be set off by closing one firing switch 59 to energize the detonator with current, say current on the order of magnitude of 1.2 amperes.

4
Principle of detector operation

As shown diagrammatically in Fig. 7 and shown in structural detail in Fig. 2, the detector means of the detector unit includes, in the preferred practice of the invention, the previously mentioned detector coil 43 with its iron core 44, the previously mentioned detector coil 45 with its iron core 46 and a bar magnet 61 which is positioned between the two detector coils in end-to-end relationship. Preferably, the iron cores 44 and 46 of the two detector coils are in contact with the corresponding ends of the bar magnet 61. The bar magnet 61, which is preferably a solid cylinder, may be made of the alloy sold under the trade name, Alnico. Each of the two detector coils 43 and 45 may be wound with a sufficient number of turns of No. 25 insulated copper wire to produce a total resistance of 10 ohms. Preferably, the two coils are of substantially the same outside diameter as the bar magnet.

In Fig. 8A showing the detector comprising the bar magnet 61 and the two detector coils 43 and 45 inside a drill pipe 63, it will be noted that the magnetic field represented by the lines of magnetic force 64 is linked with the surrounding drill pipe. In Figs. 8A, 8B, 8C and 8D, it is assumed that the detector is being lowered through the drill pipe in the direction indicated by the arrows 65 so that, in effect, there is movement upward on the part of the drill pipe relative to the detector. In these figures, a gap 68 in the drill pipe 63 represents a break in the metal of the drill pipe at a tool joint.

In Fig. 8A, the metal of the drill pipe 63 is of uniform thickness and continuous throughout the region of the detector. Under these circumstances, the pattern of the magnetic field represented by the lines of force 64 is symmetrical both with respect to the longitudinal axis of the detector and with respect to the two longitudinal halves of the detector.

In Fig. 8B, the gap 68 has moved upward relative to the detector, to a point that is near the upper end of the lower detector coil 45, but is below the lower end of the permanent magnet 61. Since the lines of magnetic force 64 follow the paths of least work or least resistance, and since the permeability of the air across the gap 68 is only a small fraction of the permeability of the metal of the drill pipe 63, the magnetic field is distorted and displaced upward by the presence of the gap 68. As a result, the number of lines of magnetic force linked with the lower detector coil 45 is substantially reduced. It has been found that whenever the number of lines cutting one of the two detector coils is reduced in this manner by distortion or displacement of the magnetic field, there is a simultaneous increase in the number of lines of magnetic force cutting the other coil. Thus, in this instance, the reduction in the number of lines of magnetic force linked with the lower coil 45 is accompanied by simultaneous increase in the number of lines of flux linked with the upper coil 43.

In Fig. 8C, the gap 68 is at approximately the longitudinal mid-point of the bar magnet 61 and since the metal of the drill pipe 63 is now symmetrical with respect to the bar magnet, the magnetic field is symmetrical. As the relative movement of the gap 68 continues upward towards and beyond the upper pole of the bar magnet, the magnetic field is distorted again but, in this instance, downwardly as indicated in Fig. 8D. It may be noted that the distortion of the magnetic field in Fig. 8D is the exact opposite of the distortion shown in Fig. 8B.

The character of the signal generated by shifting of the magnetic flux relative to the two coils 43 and 45 may be understood by referring to Fig. 7 in which the length of the detector comprising the magnet 61 and the two associated coils 43 and 45 is divided into eight zones. This division of the length of the detector into zones is made for convenience in further discussion of the effect of the described relative movement of the gap 68.

At the beginning of zone 1 in Fig. 7 with the gap 68 positioned as shown in Fig. 8A, the pattern of the flux is symmetrical because it is not disturbed by the gap. As the relative position of the gap 68 approaches the lower end of the magnetic field, however, the lines of magnetic force are progressively displaced upward until maximum upper displacement of the lines is produced as shown in Fig. 8B. In the course of this relative movement which covers zones 1 and 2 in Fig. 7, the upward shift in the lines of magnetic force is first accelerated and then decelerated to produce a pulse of current 70 lying on one side of the neutral line 71, the peak of the pulse being at the boundary between zone 1 and zone 2. In both zones 1 and 2, the number of lines of flux cutting the lower coil 45 is decreasing and simultaneously the number of lines of flux cutting the upper coil 43 is increasing with additive effect in producing a signal, but the rate of the simultaneous increase and decrease rises to a maximum and then falls backs to zero.

At the end of zone 2 with the magnetic field distorted upward to the maximum as indicated in Fig. 8B, any further relative upward movement of the gap 68 will initiate a reversal in the distortion of the magnetic field. This reversal will first result in the field becoming symmetrical as shown in Fig. 8C and as it continues, will result in the field being distorted downwardly to the maximum indicated in Fig. 8D. In the course of this further upward relative movement of the gap 68 that is represented by zones 3 and 4 in Fig. 7, the lines of flux cutting the lower coil 45 will increase and simultaneously the number of lines of flux cutting the upper coil 45 will decrease. The rates of simultaneous increase and decrease will be initially accelerated throughout zone 3 as the pattern of the magnetic field approches the symmetry shown in Fig. 8C and thereafter the rate will drop off to zero as the relatively upwardly moving gap reaches the position shown in Fig. 8D. The result of this movement of the gap 68 relatively upward through zones 3 and 4 is to produce the signal pulse of 72 of opposite polarity to the first signal pulse 70.

With the relatively upwardly moving gap 68 at the position shown in Fig. 8D at the end of zone 4, further upward movement causes a reversal in the distortion of the magnetic field since the magnetic field inherently seeks its original symmetrical pattern as the gap 68 moves out of its range. Here again, as in movement of the gap 68 through zones 1 and 2, there is a simultaneous decrease in the number of lines cutting the lower detector coil 45 and increase in the number of lines cutting the upper coil 43. Here again, the rate of simultaneous decrease and increase is first accelerated and then decelerated, the result being a third signal pulse 73 identical with the first signal pulse 70.

It is to be borne in mind that the wave form of the three-pulse signal shown in Fig. 7 is the result of a break in the continuity of the metal wall being explored by the detector, which break has the effect of increasing the reluctance in the magnetic circuit across the break. On the other hand, if the metal of the wall is continuous and increases in thickness, the reluctance of the magnetic circuit through the metal will decrease and, in general, the resulting wave form of the signal will be reversed from the wave form shown in Fig. 7. In other words, as viewed in Fig. 7, the two peaks 70 and 73 will lie on the left-hand side of the neutral axis 71 instead of on the right-hand side and the middle pulse 72 will lie on the right-hand side instead of the left-hand side of the axis.

From the foregoing, it is apparent that the polarity of the pulses of current generated in the two detector coils distinguishes between the two kinds of changes in configuration in the surrounding metal in the well bore. In practice, moreover, it is found that the different types of joints and connectors in a drill string create distinctively characteristic wave patterns that may be readily identified, especially if the signal pulses are reproduced by an oscillograph. The detector, for example, will readily respond to all three of the breaks in metal continuity at the tool joint in the drill pipe 63 in Fig. 1. This tool joint comprises a pin-end tool joint 84 combined with a box-end tool joint 85.

*Preferred embodiment of the invention*

Details of the structure of the detector unit 20 in Fig. 1 may be understood by referring to the sectional view in Fig. 2.

The individual wire strands of the sheath of the cable 24 terminate at a cable fitting inside the rope socket 23, which fitting comprises a metal ring 88 with a tubular extension 89, the ring being held in position by a suitable set screw 90. Some of the strands of the cable sheath are hooked around the lower end of the tubular extension 89 as indicated at 91 and the remaining strand ends 92 extend through bores in the metal ring 88 and are embedded in a zinc collar 93 that is cast unitary with the fitting.

The previously mentioned conductor 42 inside the cable 24, which is surrounded by suitable insulation 94, extends through the tubular extension 89 and is terminally connected to the head of a metal conductor screw 95. The conductor screw 95 is secured by means of a nut 96 inside a cylindrical sealing block 97 and is insulated from the block by a surrounding sleeve 100 of non-conducting material. Preferably, a protective wrapping 101 of splicing tape encases the insulated conductor 42 as well as the upper end portions of both the metal screw 95 and the cylindrical block 97, which is anchored by a suitable set screw 102, is provided with an external O-ring 103. Enclosed by the sealing block 97 is a tubular fitting 105 of non-conducting material that surrounds and insulates the nut 96. The tubular fitting 105, which is held in place by a split ring 106, slidingly carries a headed contact pin 109 that is both yieldably held in place and electrically connected with the conductor screw 95 by means of a suitable helical spring 110.

The main casing of the detector unit is a tubular housing 114 of non-magnetic material, preferably stainless steel. The rope socket 23 is threaded onto the pin end 113 of the housing 114 and the joint is sealed against external fluid pressure by a suitable O-ring 115. The interior of the pin end 113 is sealed by a cylindrical non-conducting body 118 that is embraced by an O-ring 119 and in turn embraces a suitable conductor screw 120, which is positioned to cooperate with the previously mentioned yieldable contact pin 109, is anchored in the non-conducting body 118 by a suitable nut 123 in a fluid-tight manner.

Inside the housing 114 is a longitudinal assembly of parts in end-to-end relation comprising: an upper cylindrical body 125 of non-conducting material; the previously mentioned detector coil 43 with the core 44 therein; the previously mentioned permanent bar magnet 61; the previously mentioned lower detector coil 45 with the core 46 therein; and a lower cylindrical body 126 of non-conducting material. The length of the housing 114 and the length of the two nonconducting bodies 125 and 126 are sufficient to space the rope sockets 23 and 26, as well as the shooting adapter 33, sufficient distances from the two detector coils 43 and 45, to avoid undue influence on the flux field of the bar magnet 61. The two rope sockets and the adapter may, therefore, be made of ferromagnetic material.

An insulated wire 129 extends through the upper cylindrical body 125 to connect the conductor screw 120 electrically with the upper end of the detector coil 43; an insulated wire 130 extends through a longitudinal peripheral groove 131 in the bar magnet 61 to connect the upper detector coil 43 with the lower detector coil 45; and a wire 132 extends from the lower end of the lower detector coil 45 to terminate in a metal contact 133 in the lower cylindrical body 126. A suitable headed contact pin 135 is slidably mounted in a non-conducting disc 136 at the lower end of the cylindrical body 126 and is both yieldingly held in place and electrically connected with the metal contact 133 by a suitable helical spring 137.

As heretofore stated, the two detector coils 43 and 45 are wound in opposite respects for addition of their effects in the creation of signals. Preferably, a disc 138 of magnetic material of approximately the same diameter as the inside diameter of the housing 114 is interposed in the described assembly at the outer end of each of the soft iron cores 44 and 46, each of the discs being cut away to provide passages for the wires of the signal circuit associated with the corresponding detector coils. These discs which are preferably made of mild steel or soft iron, serve to extend the ends of the cores of the two coils radially outward and have a desirable effect on the distribution of the lines of magnetc force making up the previously described flux patterns.

The described longitudinal assembly of parts may be held in place inside the casing 114 in any suitable manner. In the particular construction shown in the drawings, the non-conducting disc 136 at the lower end of the assembly abuts a metal spacer ring 140 that is threaded into the lower end of the casing 114, and the longitudinal assembly is continually pressed against this spacer ring by a suitable helical spring 141 at the upper end of the assembly. The lower end of the spring 141 presses against the upper cylindrical body 125 and the upper end of the spring presses against a pair of metal washers 142, which washers in turn abut against the lower end of an adjustment bushing 145. The adjustment bushing 145 which has a diametrical slot 146 at its upper end for manipulation by a screwdriver is threaded into the upper end of the casing 114.

The shooting adapter 33 has a pin end 150 that is threaded into the lower end of the casing 114 and is sealed therein by a surrounding O-ring 151. Threaded into the pin end of the shooting adapter 33 is a metal sealing block 152 surrounded by an O-ring 153 and mounted in an insulating sleeve 154 in the sealing block is a conductor screw 155 for cooperation with the previously mentioned headed contact pin 135. The conductor screw 155 is threaded into a conductor fitting 158 that is mounted in the lower end of the sealing block 152 and is insulated therefrom by a suitable non-conducting sleeve 159.

The previously mentioned insulated conductor 32 that extends upward from the detonator or blasting cap 21 is anchored in the conductor fitting 158 by means of a small set screw 160. Preferably the joint between the conductor 32 and the conductor fitting 158 is encased by a wrapping 161 of splicing tape. The lower end of the shooting adapter 33 is a threaded pin 162 onto which the lower rope socket 26 is screwed for support of the by-pass line 27 as heretofore described.

Fig. 4 shows the detector unit 20 as adapted for use alone and apart from an explosive charge. For such use, the previously mentioned shooting adapter 33 and the lower rope socket 26 are removed from the lower end of the detector casing 114 and are replaced by a solid metal nose block 170. The nose block 170 has a pin end 171 and is surrounded by an O-ring 172. As shown in Fig. 4 the yieldingly mounted contact pin 135 abuts the pin end of the nose block 170 to connect the contact pin electrically with the detector casing 114 and thereby complete the detector circuit shown in Fig. 5. Fig. 5 is like the previously described Fig. 3 with the switch 49 and the firing circuit omitted.

Fig. 6 shows diagramatically how a coil 180 energized by a suitable battery 181 in series with a resistor 182, may serve as an electromagnet to replace the previously described bar magnet 61 for creation of the required magnetic field. The remainder of the arrangement shown in Fig. 6 is identical with Fig. 5 with corresponding numerals showing corresponding parts.

It will be apparent to those skilled in the art that the described invention is not limited to my specific description and that various changes, substitutions and other departures from the disclosure may be made within the scope and spirit of the appended claims.

I claim:

1. In a device of the character described to detect changes in configuration of ferromagnetic structure in a well bore, the combination of: means to provide a magnetic field for movement through the well bore, said means having upper and lower opposite poles oriented longitudinally of the well bore; and a signal circuit including upper and lower coils in longitudinal alignment with said poles and positioned above and below said upper and lower poles, respectively, to respond to changes in the two halves, respectively, of the magnetic field as the magnetic field varies in response to changes in the surrounding ferromagnetic structure in the course of the movement of the magnetic field through the well bore, said two coils being oppositely wound and being connected in series so that opposite changes in linkage of the magnetic field with the two coils will be additive in their effect with respect to generation of current in the circuit of the two coils.

2. A device as set forth in claim 1 in which said means to provide a magnetic field is a permanent magnet.

3. A device as set forth in claim 2 in which said two coils have ferromagnetic cores.

4. A device as set forth in claim 3 in which said cores are in contact with said permanent magnet at their inner ends.

5. A device as set forth in claim 4 in which said permanent magnet is cylindrical in configuration and in which the outside diameter of said two coils is on the order of magnitude of the outside diameter of the permanent magnet.

6. In a device of the character described to detect changes in configuration of ferromagnetic structure along the length of a well bore, the combination of: a permanent magnet adapted for lowering into the well bore with the magnet aligned longitudinally thereof; and a signal circuit including two coils respectively at the opposite ends of said permanent magnet, said two coils being oppositely wound and being connected in series so that opposite changes in linkage of the magnetic field of the permanent magnet with the two coils will be additive in their effect with respect to generation of current in the circuit of the two coils.

7. A device as set forth in claim 6 which includes a tubular housing of non-magnetic material enclosing said magnet and coils; and in which said coils and magnet are dimensioned in outside diameter to substantially fill the inside diameter of the tubular housing.

8. In a device of the character described to detect change in configuration of ferromagnetic structure in a well bore, the combination of: means to provide a substantially constant unidirectional magnetic field for movement through the well bore, said means having upper and lower opposite poles oriented longitudinally of the well bore; upper and lower coils in longitudinal alignment with said poles and positioned above and below said upper and lower poles, respectively, to respond to changes in the two halves, respectively, of the magnetic field as the magnetic field varies in response to change in the surrounding ferromagnetic structure in the course of the movement of the magnetic field through the well bore, said two coils being oppositely wound and connected in series so that opposite changes in flux linkage in the two coils will be additive in effect with respect to generation of current in the two coils; a transformer having one side connected in series with said two coils to complete a primary circuit; and indicating means connected to the other side of the transformer to complete an indicating circuit.

References Cited in the file of this patent

UNITED STATES PATENTS

| | | |
|---|---|---|
| 2,065,118 | Davis | Dec. 26, 1936 |
| 2,124,579 | Knerr et al. | July 26, 1938 |
| 2,275,675 | Draper et al. | Mar. 10, 1942 |
| 2,315,045 | Breitenstein | Mar. 30, 1943 |
| 2,317,720 | Barnes et al. | Apr. 27, 1943 |
| 2,554,844 | Swift | May 29, 1951 |
| 2,558,427 | Fagan | June 26, 1951 |
| 2,582,437 | Jezewski et al. | Jan. 15, 1952 |